(12) United States Patent
Brodeur et al.

(10) Patent No.: US 8,108,645 B2
(45) Date of Patent: Jan. 31, 2012

(54) OPTIMIZED MEMORY ALLOCATION VIA FEATURE EXTRACTION

(75) Inventors: Robert R. Brodeur, Auburn, CA (US); Robert A. Nebeker, Sacramento, CA (US); Cheng Nam Lee, Singapore (SG)

(73) Assignee: Hewlett-Packard Development Company, L.P., Houston, TX (US)

(*) Notice: Subject to any disclaimer, the term of this patent is extended or adjusted under 35 U.S.C. 154(b) by 858 days.

(21) Appl. No.: 12/147,271

(22) Filed: Jun. 26, 2008

(65) Prior Publication Data

US 2009/0327639 A1   Dec. 31, 2009

(51) Int. Cl.
*G06F 12/02* (2006.01)
*G06F 9/44* (2006.01)

(52) U.S. Cl. ........................................ 711/170; 717/151
(58) Field of Classification Search .................. None
See application file for complete search history.

(56) References Cited

U.S. PATENT DOCUMENTS

| | | | |
|---|---|---|---|
| 6,247,175 B1* | 6/2001 | Ledford et al. | 717/157 |
| 6,282,621 B1* | 8/2001 | Parsons | 711/170 |
| 7,610,366 B2* | 10/2009 | Wilson, Jr. | 709/223 |
| 7,765,541 B1* | 7/2010 | Noordergraaf et al. | 717/175 |
| 2002/0023196 A1* | 2/2002 | Hirai | 711/154 |
| 2004/0064808 A1* | 4/2004 | Kira | 717/154 |
| 2005/0097546 A1* | 5/2005 | Johnson | 717/177 |
| 2006/0048138 A1* | 3/2006 | Boctor et al. | 717/174 |
| 2007/0283328 A1* | 12/2007 | Javed et al. | 717/127 |
| 2007/0294683 A1* | 12/2007 | Lee et al. | 717/162 |
| 2008/0133598 A1* | 6/2008 | Williams et al. | 707/104.1 |
| 2008/0184220 A1* | 7/2008 | Chen et al. | 717/171 |
| 2009/0113444 A1* | 4/2009 | Hackborn et al. | 719/312 |
| 2009/0249313 A1* | 10/2009 | Sobel et al. | 717/140 |
| 2009/0307673 A1* | 12/2009 | Eichenberger et al. | 717/160 |
| 2010/0175053 A1* | 7/2010 | Jansseune | 717/133 |

* cited by examiner

*Primary Examiner* — Kaushikkumar Patel

(57) ABSTRACT

A method and system for recovering embedded system memory contained within an embedded system includes a software image in embedded system memory and identifying unneeded software features in the software image; identifying memory portions containing the unneeded software features; and reallocating the memory portions containing the unneeded features.

19 Claims, 7 Drawing Sheets

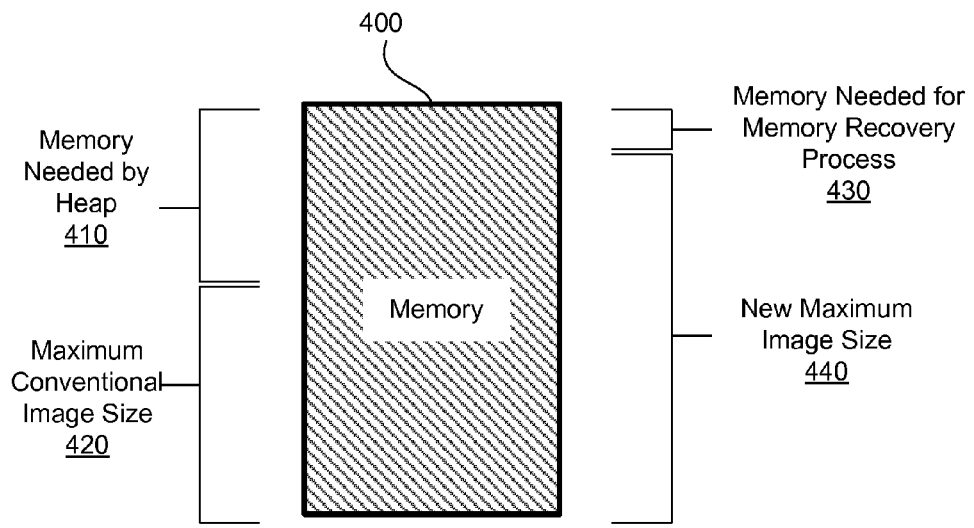
*Fig. 4*
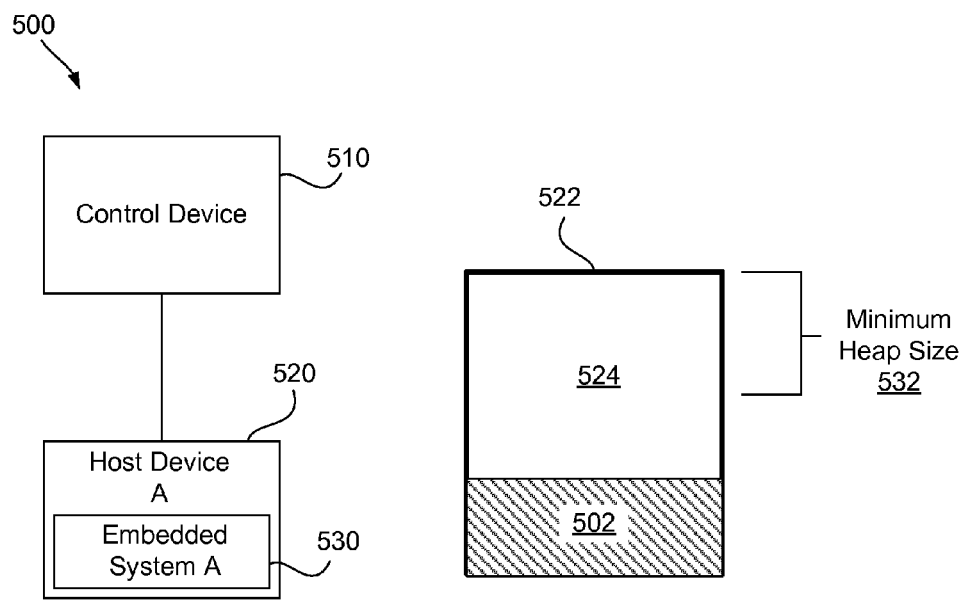
*Fig. 5A*  *Fig. 5B*

OPTIMIZED MEMORY ALLOCATION VIA FEATURE EXTRACTION

BACKGROUND

Embedded systems are limited-purpose computer or processing systems optimized to perform one or more specialized functions. Often embedded systems are used to perform computation and/or control functions for the operation of a host device. For example, embedded systems can be included in such common host devices as wristwatches, network switches, and mobile phones.

To reduce the cost and complexity of the overall system, embedded systems are often specifically tailored to the needs of the host device. Consequently, the amount of memory provided in or for the embedded device is often minimized to reduce costs. This may become an issue, however, if the embedded system needs additional memory to later accommodate upgraded firmware or to support additional hardware.

Further, to reduce the complexity of the embedded system, the management of the embedded system memory is usually accomplished using relatively simple methods. These simple methods often lead to inefficient memory allocation, which may put more pressure on the already limited memory of the embedded system. This inefficient memory allocation may result in reduced functionality of the embedded system and/or the premature retirement of the host device due to seemingly insufficient embedded memory capacity.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 4 is a diagram of illustrative memory constraints in an embedded system, according to one embodiment of principles described herein.

FIG. 5A is a diagram of an illustrative device network in which an embedded system may operate, according to one embodiment of principles described herein.

FIG. 5B is an illustrative diagram of memory usage in an embedded system, according to one embodiment of principles described herein.

Throughout the drawings, identical reference numbers designate similar, but not necessarily identical, elements.

DETAILED DESCRIPTION

As noted above, embedded systems with limited amounts of memory may become constrained by a lack of available memory resources when a new feature or new hardware support is to be added. The following specification describes systems and methods that optimize and recover memory for an embedded system by placing executable code for one or more features at prescribed locations in memory. Consequently, at any time when the running system decides that it does not need to use the feature at the prescribed location, the executable code for that feature can be cleared and released to the system to be used by other applications.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

As used herein and in the appended claims, the term "embedded system" refers to a special purpose computer or processing system designed to perform one or more dedicated functions for a host device in or with which the embedded system is contained. As noted above, embedded systems are typically included in a host device to provide the host device with specific computational and/or control capabilities.

Figure 1:
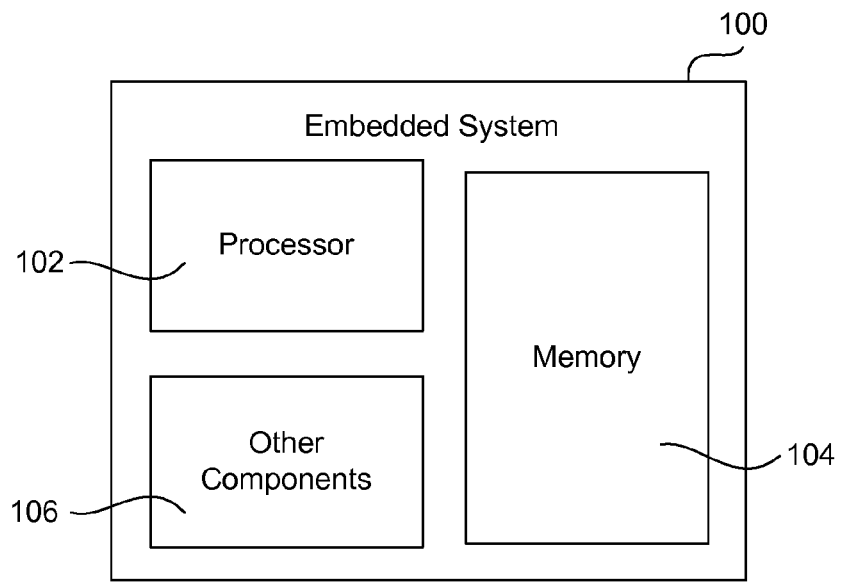
FIG. 1 is a diagram of an illustrative embedded system, according to one embodiment of principles described herein.

In FIG. 1, a generalized diagram of the components of an embedded system (100) is shown. Embedded systems usually include one or more processors (102), memory (104), and, in various embodiments, other specialized components (106). The memory (104) may be used to contain software or firmware used by the processor during the operation of the embedded system. Consequently, in various embodiments, memory (104) may be made up of one or more different memory types and technologies, including both volatile and non-volatile memory units. By way of example and not limitation, memory (104) may include one or more of: random access memory (RAM), static random access memory (SRAM), dynamic random access memory (DRAM), erasable programmable read only memory (EPROM), electrically erasable programmable read only memory (EEPROM), magneto-resistive random access memory (MRAM), memory types that utilize the floating body effect, Flash memory, and other suitable memory types.

Each physical component of an embedded system is chosen to be powerful enough to perform the functions for which the embedded system is included in the host device, yet simple enough that cost is not increased by unneeded features. For example, the included processor (102) may be limited in its programmability to operations needed in the functions of the embedded system. Further, the memory (104) may be just large enough to allow the intended operation of the embedded system. The other specialized components (106) may only include those that will be used to perform the embedded system's intended set of tasks. By limiting the embedded system to a small number of tasks and specifically tailoring the system components to accomplish those tasks, an embedded system may be optimized for various desirable characteristics such as speed, stability, and low cost.

To execute the intended set of tasks, embedded systems follow instructions contained in memory (104). This software or firmware is usually developed on a general purpose computer, such as a desktop or laptop computer. Before the software can be loaded onto an embedded system, it must first be compiled, or translated into code that the embedded system can understand, and then linked into a file or object. Throughout the specification and appended claims, this file or object will be referred to as a software image. The software image can then be loaded into the memory (104) of the embedded system (100). The software image is then accessible to the embedded system processor (102) for execution of the instructions.

Figure 2:
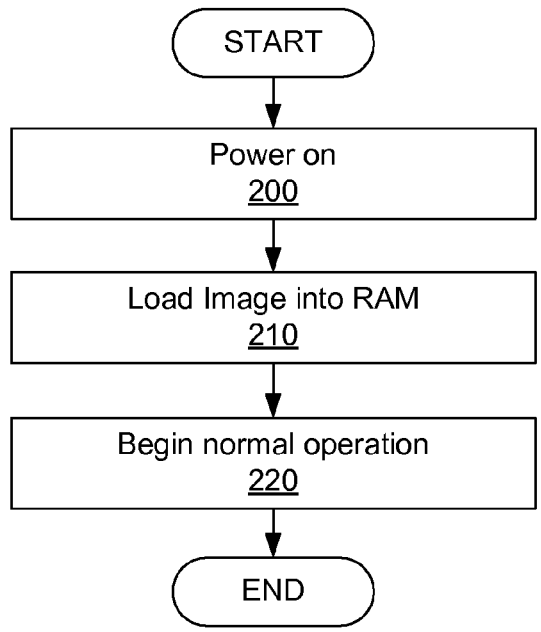
FIG. 2 is a flowchart showing an illustrative method of loading a software image into memory, according to one embodiment of principles described herein.

FIG. 2 shows an exemplary method for loading a software image into memory. First, the embedded system (e.g., 100, FIG. 1) is powered (step 200) to provide the required electrical power to operate the embedded memory (e.g., 104, FIG. 1). After the system is powered, the software image is loaded into the embedded memory (step 210). The embedded system (100) then begins operating (step 220) according to the instructions in the software image. Conventionally, the entire software image remains in embedded memory during the operation of the device.

The remaining portion of memory not occupied by the software image may be allocated for use by the embedded system in carrying out instructions given in the software image. This remaining available memory is often referred to as the heap or the free store. Thus, the amount of memory required by an embedded system is not only dependent on the size of the software image, but also on the amount of memory needed by the processor to store needed data resulting from execution of the software image. This data may include both intermediate data generated during the execution of the software image and data resulting from running the software image that will be needed by the host device.

A software image may contain both programming instructions and data that are used for the operation of the embedded system. The software image may be divisible into separate software features, where each feature is a modular unit containing instructions and data used in a given task or in conjunction with a given piece of hardware. These software features may include, but are not limited to, software code to support various versions of embedded operating systems, embedded system hardware, peripherals, or host devices. For example, a given software feature may only be needed to support a specific model or embedded system hardware platform. Whenever this particular hardware platform is not being used, the system could function properly even if that software feature was not included in the software image.

Even though this is the case, It is often desirable to design a single software image that is targeted to multiple devices or operating environments. For example, it may be simpler to make a software image that will work for two different versions of a host device, rather than creating a different image for each individual device. As another example, a device may require a first software feature or a second software feature, but never both at the same time. In conventional systems, the entire software image is kept in the memory of each embedded system. Consequently, there may be memory dedicated to storing software features that are not needed by a specific embedded system because of the specific version of host device in which it is deployed.

Clearly, there can be several disadvantages to storing unneeded software features in memory. The inefficient use of memory may require that the embedded device be designed with greater amounts of memory than would otherwise by the case, leading to a higher cost to produce the embedded device. Additionally, the inefficient use of memory may also limit the ability to update the device with a larger, upgraded software image. An upgraded software image may be used to accommodate changes to a host device or the environment in which the host device operates. The inability to update the software image due to inefficient memory allocation can lead to the premature retirement of the host device.

Figure 3:
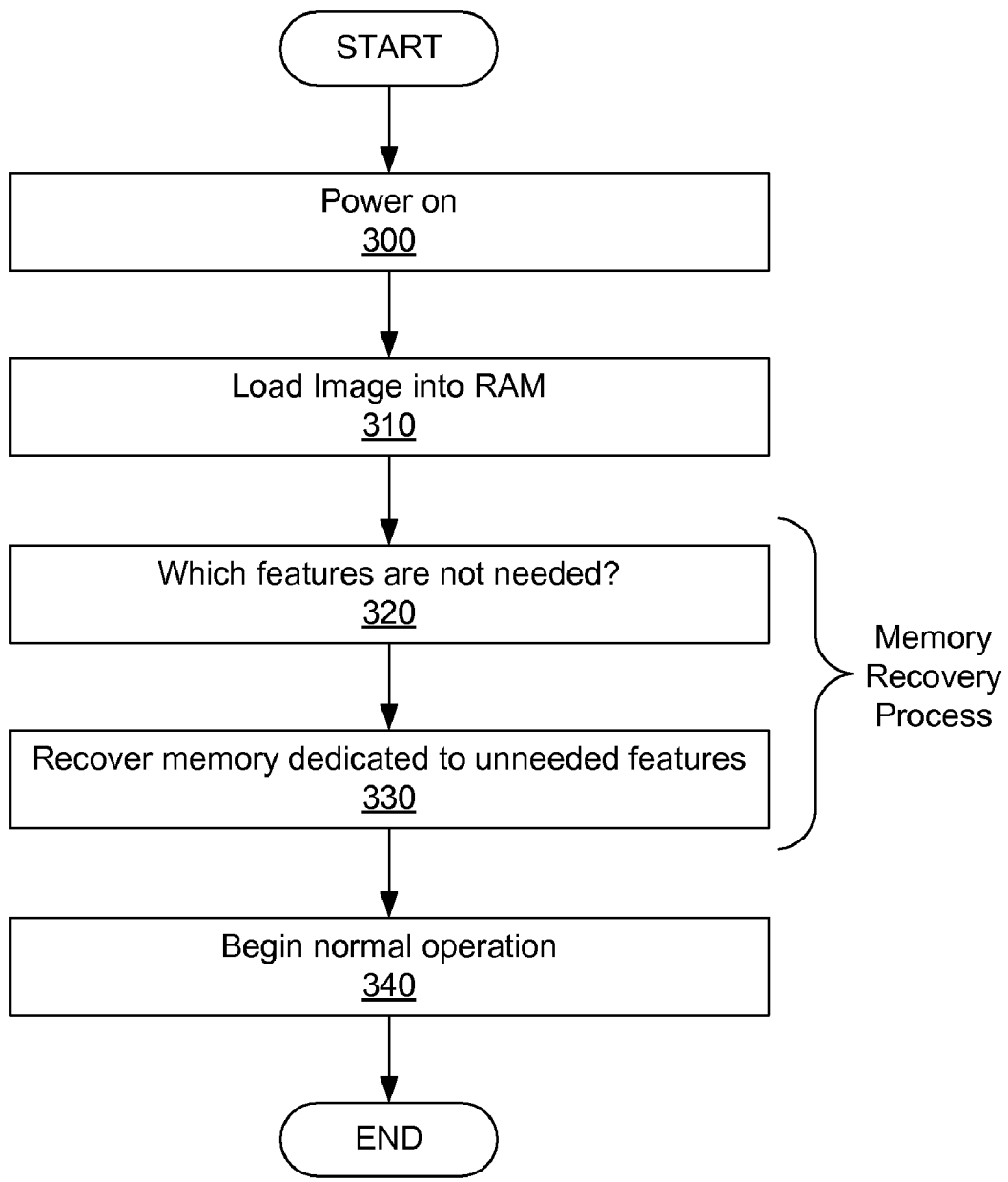
FIG. 3 is a flowchart showing an illustrative method of loading a software image into memory, according to one embodiment of principles described herein.

To more efficiently use memory in embedded systems, the present specification discloses exemplary systems and methods to recover memory by extracting unneeded software features. FIG. 3 is a flow diagram of an exemplary method for extracting unwanted software features from a software image that is loaded into memory. After the embedded system is powered on (step 300), a software image is loaded into memory (step 310). The system then begins a memory recovery process. It determines which features are not needed by the system (step 320) and then recovers the memory dedicated to code support those unneeded features (step 330). This recovered memory may then be allocated to the system heap, upgraded software, or other memory task. The normal operation of the system may then begin (step 340).

Determining which features are not needed (step 320) may be done based on many factors. For example, the embedded system may be instructed to remove certain software features simply based on the serial number of the embedded system, the identity of the host device, or based on peripheral hardware to which the host device is connected. For example, the embedded system may compare its host's identifier to a list which indicates which software features are required for the function of that specific host. Other software features can be discarded and the memory recovered for other uses. In this manner, an embedded system can optimize the allocation of memory to store only the software features that specifically apply to its own operation.

In FIG. 4, an illustrative block of memory (400) within an embedded device is shown. This block of memory (400) is generally divided into two segments: a first segment which stores the software image and a second segment which is used by the processor as it executes the instructions contained within the software image.

Conventionally, the maximum allowable image size must be limited such that there is sufficient uncommitted memory available to execute the instructions contained in the software image. This remaining memory is allocated to a system heap that is used by the processor during execution of the software image.

On the left in FIG. 4, brackets indicate the amount of memory needed for the heap (410) and the resulting maximum conventional image size (420). However, if unneeded features are extracted from a software image, the initial size of the image may be increased up to a point where only an amount of memory needed (430) to perform the memory recovery process is left. This assumes that the memory recovery process will reduce the initial image size (440) sufficiently to accommodate the head (410) during subsequent system operation.

Because, the amount of memory needed for the memory recovery process (430) may be much less than that needed by the heap (410) during normal operation, the new maximum image size (440) of the software image, prior to memory recovery, may be much larger than the conventional maximum image size (420). This allows an initial software image written to support multiple host versions, for example, to be larger, knowing that the features unneeded by the host in which the image is deployed will be extracted to accommodate the heap by the memory recovery process (430).

In FIG. 5A, a diagram of an illustrative network of electronic devices (500) is shown. The network (500) consists of a control device (510) connected to a host device (520). The host device (520) contains an embedded system (530). According to one illustrative embodiment, the host device (520) is a random access memory (RAM) only device, meaning that it does not have long-term memory storage. The control device (510) stores the software image required for the operation of the host device A (520).

FIG. 5B shows a block of RAM (522) representing the total RAM in the embedded system (530). The image (502) has been loaded into memory and the remaining RAM (524) is available for use as the system heap. The remaining memory (524) exceeds the minimum heap size (532), allowing the embedded system A (530) to execute the commands contained in the software image (502).

Figure 6:
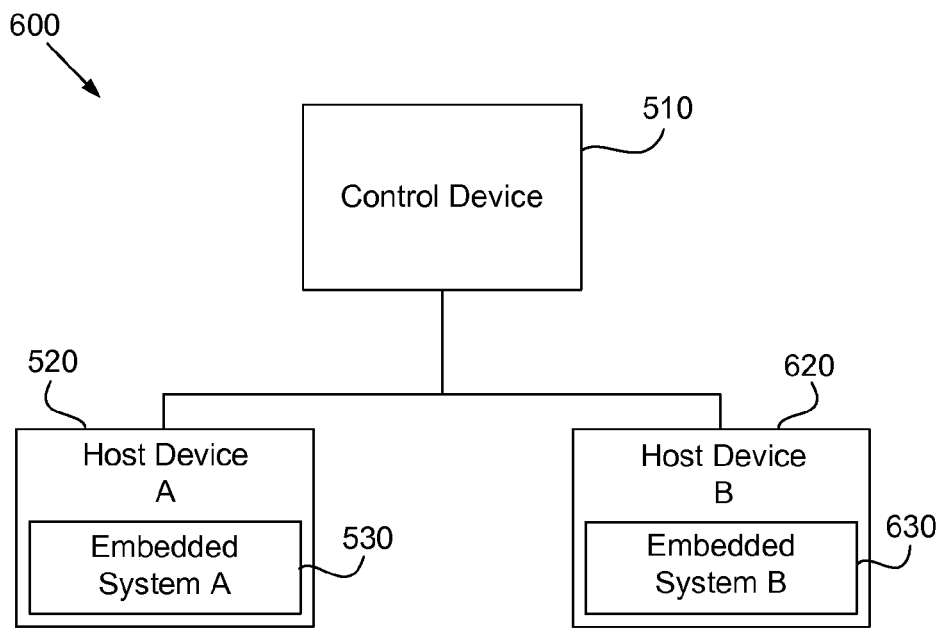
FIG. 6 is a diagram of an illustrative device network in which an embedded system may operate, according to one embodiment of principles described herein.

FIG. 6 shows an illustrative diagram of an expanded network of electronic devices (600). This expanded network includes a second host device (620) containing a second embedded system (630). According to one exemplary embodiment, both host devices (520, 620) are RAM-only devices. However, the second host device (620) has more RAM in its embedded system and additional hardware. The additional hardware on the second host device (620) requires additional software to be included in the software image.

There may be a variety of reasons for connecting additional host devices (520, 620) to a control device (510). By way of example and not limitation, a new model of the host device may have been released with additional capabilities. Alternatively, the tasks controlled by the system may have expanded. Because the previous software image stored on the control device (510) does not contain additional instructions and software features required by the second host device (620), an updated software image is required. Including more software in the software image will make it larger.

An alternative to a larger software image may be the use of two software images. However, the system (600) may not be configured to distribute multiple software images. For example, the control device (510) may not have enough memory to hold the additional image. In other cases, the control device, the network, or the host devices may not be configured to manage multiple software images. For example, the first host device (520) may not be configured to differentiate between a first software image and a second software image sent over the network. Additionally, the manufacturer of the host device and embedded system may provide and support only one "universal" software image. For these and other reasons, it can be desirable to configure an embedded system to recover memory from unneeded features.

Figure 7:
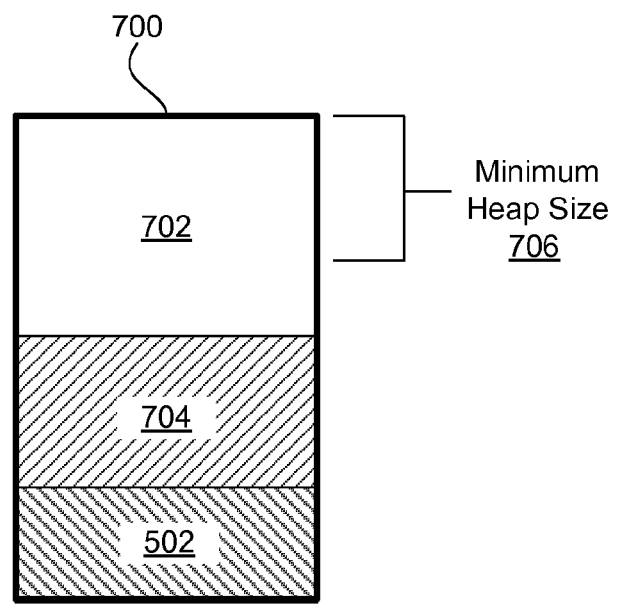
FIG. 7 is an illustrative diagram of memory usage in an embedded device, according to one embodiment of principles described herein.

FIG. 7 represents a block of RAM (700) on the second host controller (620). In this example, the block of RAM (700) on the second host controller (620) is significantly larger than the block of RAM (522) on first host device (520). An updated software image (502, 704) is loaded into the block of RAM (700). The updated software image comprises a first block (502) that includes the software in the original software image and a second block (704) that includes the software required to support the new embedded system (630). Because there is enough remaining memory (702) to meet the requirements of the heap and both memory blocks (502, 704) are needed for proper operation of the device, neither of the blocks will be removed during the memory recovery process.

Figure 8A:
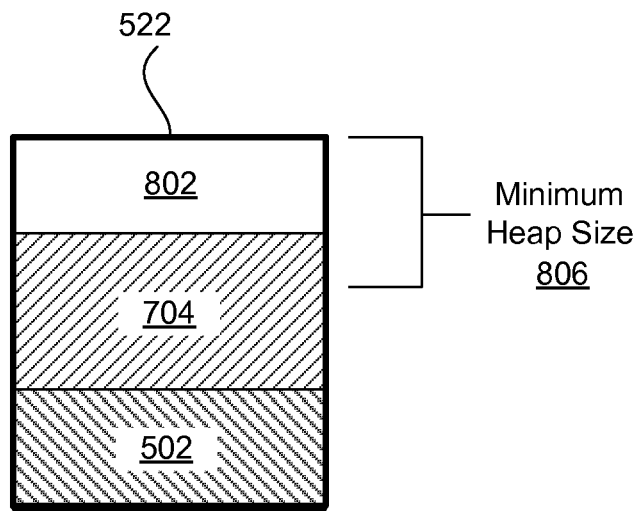
FIG. 8A is an illustrative diagram of memory usage of an embedded device before the memory recovery process begins, according to one embodiment of principles described herein.

FIG. 8A shows the block of RAM (522) contained within the first embedded system (530, FIG. 6) with the new software image (502, 704) loaded. With both blocks (502, 704) in RAM, the embedded system (530, FIG. 6) does not have enough memory available for the heap to execute the instructions in the software image (502, 704).

Figure 8B:
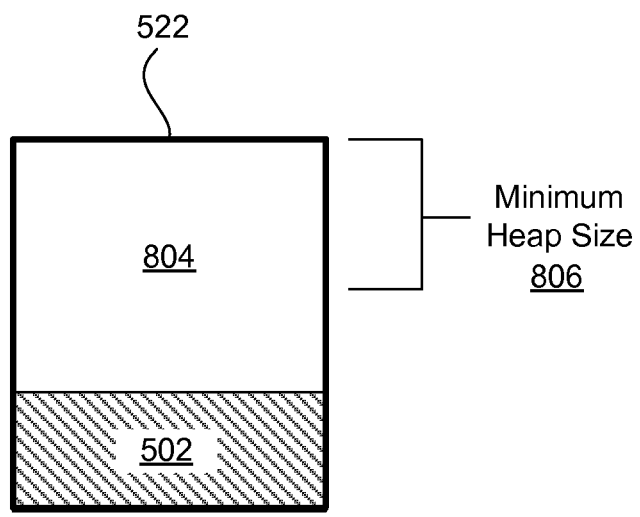
FIG. 8B is an illustrative diagram of memory usage after the memory recovery process has finished, according to one embodiment of principles described herein.

FIG. 8B shows the block of RAM (522) in the first embedded system (530, FIG. 6) after the unneeded block (704) of the software image is recovered. This creates a large section of uncommitted memory (804) which is available for use by the processor during the execution of the software image (502). Because this section of uncommitted memory (804) is greater than the minimum heap size (806), the first embedded system (530; FIG. 6) will be able to operate correctly, even though it initially received a software image that was too large for its capacity and contained unneeded code. If the first embedded system (530; FIG. 6) did not have the ability to remove the unneeded code block (704), the first host device (520; FIG. 6) may have been nonfunctional and required replacement.

Figure 9A:
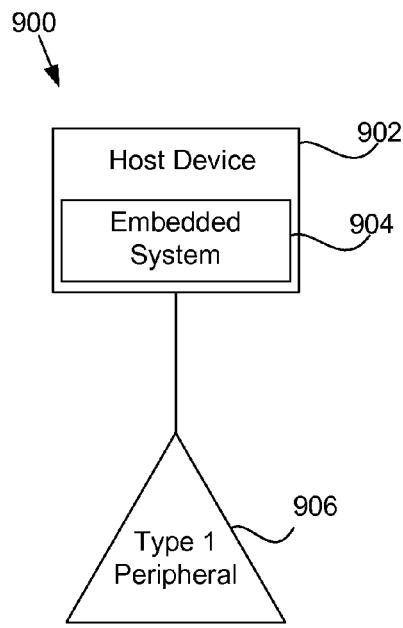
FIG. 9A is a diagram of an illustrative host device attached to a peripheral device, according to one embodiment of principles described herein.
Figure 9B:
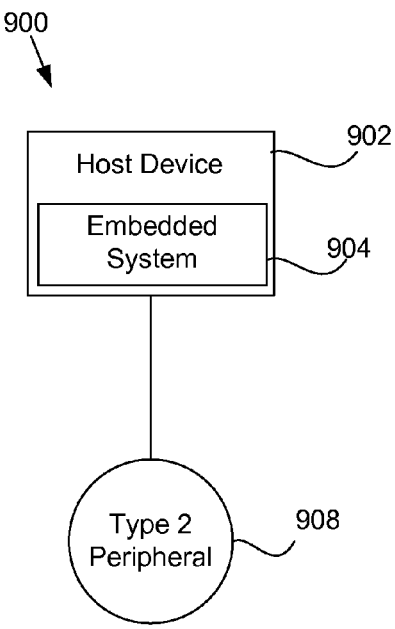
FIG. 9B is a diagram of an illustrative host device attached to a peripheral device, according to one embodiment of principles described herein.

FIGS. 9A and 9B show two different configurations of an electronic system (900) which includes a host device (902) configured to connect to a number of peripherals and an embedded system (904) which supports the functionality of the host device (902). According to one illustrative embodiment, the host device (902) contains long-term storage memory which allows a software image to be stored locally on the host device (902). The software image is then transferred into RAM contained within the embedded device (904). In FIG. 9A, the host device (902) is connected to a type 1 peripheral (906). In FIG. 9B, the host device (902) is connected to a type 2 peripheral (908). The two types of peripherals (906, 908) expand the functionality of the system in different ways and require different software features for proper operation.

Figure 10A:
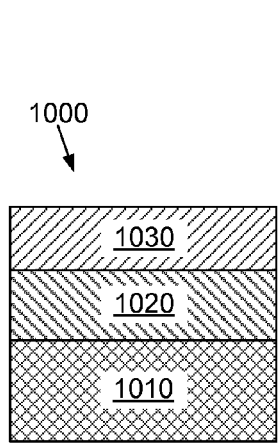
FIG. 10A is a diagram of an illustrative software image, according to one embodiment of principles described herein.

FIG. 10A shows a diagram of an exemplary software image (1000) for the embedded system (904). This software image (1000) consists of a first block (1010), a second block (1020), and a third block (1030). According to one illustrative embodiment, the first block (1010) contains software code that will be required by the device (900) regardless of the type of peripheral it supports. It may contain, for example, operating system code and memory recovery code. The second block (1020) contains code to support the operation of the type 1 peripheral (906). The third memory block (1030) contains code to support the operation of the type 2 peripheral (908).

Figure 10B:
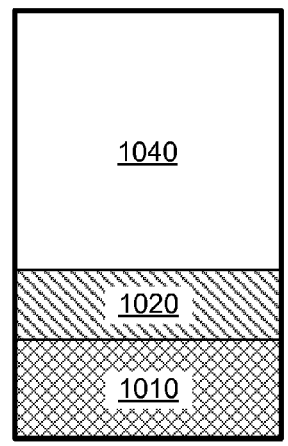
FIG. 10B is an illustrative diagram of memory usage within an embedded system, according to one embodiment of principles described herein.

FIG. 10B shows the RAM usage of the embedded system (904) when it is connected to the type 1 peripheral (906, FIG. 9A) and the memory recovery process has finished. The third block (1030) of the software image (1000) was released because the device did not need to support the type 2 peripheral (908, FIG. 9B). The remaining memory (1040) can then be allocated to the heap.

Figure 10C:
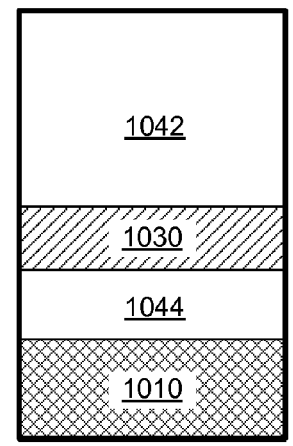
FIG. 10C is an illustrative diagram of memory usage, according to one embodiment of principles described herein.

FIG. 10C shows the RAM usage of the embedded system (904) when it is connected to the type 2 peripheral (908, FIG. 9B) and the memory recovery process has finished. As shown in FIG. 10C, the second memory block (1020) of the software image (1000) was released because the embedded system (904) did not need to support the type 1 peripheral. The released memory (1044) can then be allocated to the heap.

In this case the free memory (1042, 1044) is not a contiguous block of memory. This leads to a split heap configuration. Split heaps will be discussed below in further detail.

According to one illustrative embodiment, the instructions and data that enable the recovery of memory dedicated to unneeded feature are contained within the software image. For example, in order to remove unneeded software features resident in the embedded system memory, the system must know where the features reside in memory. A log of these feature locations may be made and included in the software image. Then, when it is determined that a feature is unneeded, those memory locations can be released and allocated for use by the system heap. The software image may also contain instructions for determining which features are unneeded and how to release their memory locations. Consequently, in some embodiments, an updated image may be all that is necessary to enable this method, even on older embedded systems.

As illustrated in FIG. 10C, releasing software features can result in a fragmentation of free memory. This fragmented free memory may be less useful than larger contiguous blocks of free memory. Generally, during the compile and linking process used to create a software image, the location of features in memory is not controlled. Thus, the features, and even multiple portions of a single feature, may be distributed throughout the software image. If the memory for this feature is recovered, this may result in a severely fragmented heap. Although a split heap may be used, a contiguous heap may be more efficient and useful than a heap split into two or more parts.

To minimize the fragmentation of free memory that occurs when one or more software features are released, the software image can be modified so that the various software features are loaded into memory in a certain order or memory location. The software image is typically loaded onto the embedded system memory beginning with the lowest memory address and continuing until the complete software image is loaded.

By controlling the order in which the software features are stored in the software image, the amount of free memory fragmentation can be minimized. If, for example, a particular feature is the most likely to be released by the system, it could be placed at the top of the image so that, if released, the memory it occupied can be contiguously incorporated into the system heap. On the other hand, there may often be a software feature that will never be released. Therefore, placing this software feature at the bottom of the image may reduce the fragmentation of the heap. Additionally, software features that are likely to be released together can be grouped to reduce fragmentation. Custom linker scripts may be used to place the features in the desired order and in the desire grouping.

However, there may be a variety of competing considerations which can be weighed against the need for minimizing the fragmentation of the free memory. For example, limitations may be imposed by the development software used to program, compile, and link the software image. Performance considerations, such as execution time and boot up time, may also be important in some systems. These and other consideration may be weighed by the software developer to reach the desired arrangement of software features within memory.

Figure 11:
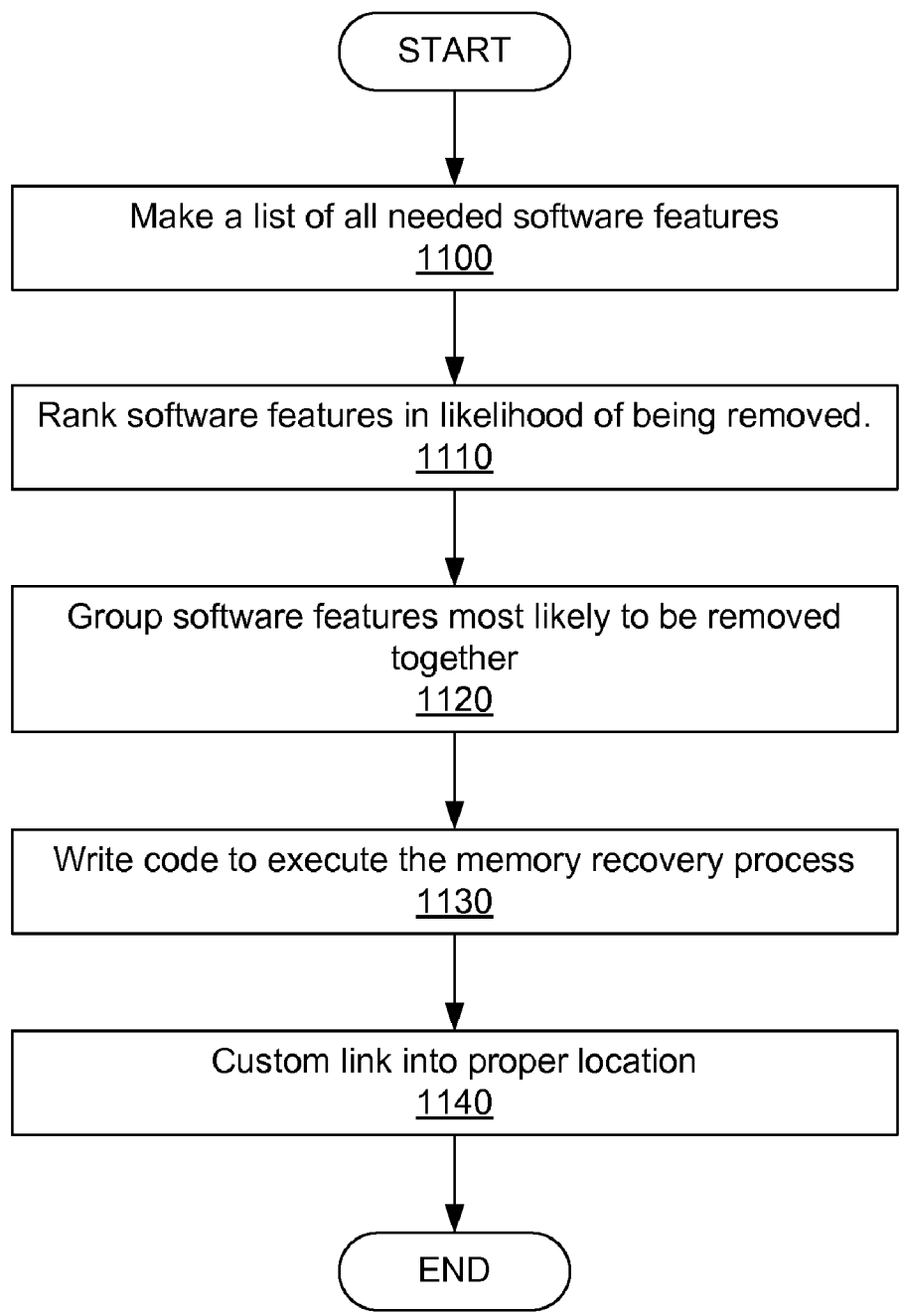
FIG. 11 is an illustrative flowchart showing an exemplary method of arranging features of a software image, according to one embodiment of principles described herein.

FIG. 11 shows a flow chart of an illustrative method for creating a software image. A designer begins creating a software image by making a list of all the software features that will need to be included in the image (step 1100). The included software features will depend, in part, on the embedded systems for which the image is targeted and hardware that needs to be supported.

Next, the designer will rank the features on their likelihood of being removed (step 1110). According to one embodiment, features can be ranked in order of descending likelihood of being removed. For example, certain features, such as the operating system, may never be removed by any of the target embedded systems. Such features could be placed at the bottom of the list, meaning that they are stored in memory away from the area that will generally contain the heap. If there are features with approximately equal likelihood of being removed, those most likely to be removed together could be placed next to each other on the list (step 1120). This could lead to the release of greater contiguous portions of memory and minimize the fragmentation of free memory. At this point, any other considerations of efficiency can be taken into account. These considerations could include limits imposed by the particular linking process or the operating system to be used.

When the features are satisfactorily organized, instructions for the removal of unwanted features may be written (step 1130). Next, the features may be compiled and linked (step 1140) into the order determined in the previous steps. This will most likely be done with linker scripts as default linkers will not generally put the features in the above discussed order. After completion of any additional tasks, the software image may be written to the embedded device.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for recovering embedded system memory contained within an embedded system comprising:
   loading a software image into said embedded system memory, said software image comprising a plurality of software features grouped according to a predicted likelihood of each said software feature being removed from said software image;
   identifying unneeded said software features in said software image;
   identifying memory portions containing said unneeded software features; and
   reallocating said memory portions containing said unneeded features.

2. The method of claim 1, wherein said reallocating memory portions comprises reallocating said memory portions to a system memory heap.

3. The method of claim 1, wherein said unneeded features are identified based on any of: a current operating environment of said embedded system, peripherals associated with said embedded system, properties of a host associated with said embedded system, and properties of said embedded system.

4. The method of claim 1, wherein said memory portions are identified using a log file, said log file having a record of where said software features are loaded into said embedded system memory.

5. The method of claim 1, wherein instructions for recovering embedded system memory are contained within said software image.

6. The method claim 1, wherein said embedded system memory is random access memory.

7. The method of claim 1, wherein said software image is assembled such that fragmentation of a system memory heap is reduced.

8. The method of claim 7, wherein software features having a low likelihood of being removed are written to memory addresses away from a location used for a system memory heap.

9. The method of claim 7, wherein linker scripts are used to assemble said software image.

10. The method of claim 2, wherein said system memory heap is split.

11. The method of claim 1, wherein said software image is constructed by:
    listing software features to be contained within said software image;
    ranking said software features according to their likelihood of being removed;
    writing memory recovery code for inclusion in said software image; and
    linking said software features and said memory recovery code into a software image.

12. The method of claim 11, wherein said linking of said software features further comprises evaluation of development software, linking software, and performance considerations to determine said ranking of said software features.

13. The method of claim 1, wherein said unneeded software features are associated with any of: a peripheral device not present, operating system variations, and a hardware model not present.

14. A method for recovering embedded system memory contained within an embedded system comprising:
    listing software features to be contained within a software image;
    ranking said software features according to their likelihood of being removed and grouping said software features according to their likelihood of being removed together;
    writing memory recovery code for inclusion in said software image;
    linking said software features and said memory recovery code into a software image;
    loading said software image into said embedded system memory;
    writing a log file, said log file having a record of where said software features are loaded into said embedded system memory;
    identifying unneeded software features in said software image;
    identifying memory portions containing said unneeded software features; and
    releasing allocation of said memory portions containing said unneeded features.

15. The method of claim 14, further comprising allocating said memory portions containing unneeded features to a system memory heap.

16. An embedded system comprising:
    a processor;
    memory storing a software image, said software image comprising a plurality of software features grouped according to a predicted likelihood of each said software feature being removed from said software image;
    wherein said processor is configured to use said software image stored in said memory to recover memory capacity by:
        identifying unneeded software features in said software image;
        identifying portions of said memory containing said unneeded software features; and
        reallocating said memory portions containing said unneeded features.

17. The system of claim 16, wherein said reallocated memory portions are reallocated to a system memory heap.

18. The system of claim 16, wherein said memory portions are identified using a log file, said log file having a record of where said software features are loaded into said memory.

19. The method of claim 16, wherein said unneeded software features are associated with any of: a peripheral device not present, operating system variations, and a hardware model not present.

* * * * *

UNITED STATES PATENT AND TRADEMARK OFFICE
CERTIFICATE OF CORRECTION

| | | |
|---|---|---|
| PATENT NO. | : 8,108,645 B2 | Page 1 of 1 |
| APPLICATION NO. | : 12/147271 | |
| DATED | : January 31, 2012 | |
| INVENTOR(S) | : Robert R. Brodeur et al. | |

It is certified that error appears in the above-identified patent and that said Letters Patent is hereby corrected as shown below:

In the Claims:

In column 9, line 8, in Claim 6, delete "method" and insert -- method of --, therefor.

In column 10, line 39, in Claim 19, delete "method" and insert -- system --, therefor.

Signed and Sealed this
Eighteenth Day of December, 2012

David J. Kappos
*Director of the United States Patent and Trademark Office*